(12) United States Patent
Washio et al.

(10) Patent No.: US 11,179,957 B2
(45) Date of Patent: Nov. 23, 2021

(54) PRIMER FOR INKJET AND METHOD FOR MANUFACTURING A PRINTED MATERIAL

(71) Applicant: TOYOINK AMERICA, LLC., Wood Dale, IL (US)

(72) Inventors: Satoshi Washio, Wood Dale, IL (US); Atsushi Nakazato, Conyers, GA (US); Wataru Shikiji, Wood Dale, IL (US); Yasutaka Ida, Wood Dale, IL (US)

(73) Assignee: TOYOINK AMERICA, LLC, Wood Dale, IL (US)

( * ) Notice: Subject to any disclaimer, the term of this patent is extended or adjusted under 35 U.S.C. 154(b) by 0 days.

(21) Appl. No.: 16/516,919

(22) Filed: Jul. 19, 2019

(65) Prior Publication Data

US 2021/0016589 A1    Jan. 21, 2021

(51) Int. Cl.
| | |
|---|---|
| *B32B 3/10* | (2006.01) |
| *B41M 5/50* | (2006.01) |
| *C09D 11/54* | (2014.01) |
| *C09D 11/322* | (2014.01) |
| *C09D 11/033* | (2014.01) |
| *C09D 11/108* | (2014.01) |
| *C09D 11/037* | (2014.01) |
| *C09D 11/101* | (2014.01) |

(52) U.S. Cl.
CPC .......... *B41M 5/502* (2013.01); *C09D 11/033* (2013.01); *C09D 11/037* (2013.01); *C09D 11/101* (2013.01); *C09D 11/108* (2013.01); *C09D 11/322* (2013.01); *C09D 11/54* (2013.01)

(58) Field of Classification Search
CPC .... B41M 5/502; C09D 11/033; C09D 11/037; C09D 11/101; C09D 11/108; C09D 11/322; C09D 11/54
See application file for complete search history.

(56) References Cited

U.S. PATENT DOCUMENTS

| | | | |
|---|---|---|---|
| 8,765,852 B1* | 7/2014 | Swei | C09D 191/06 524/277 |
| 2002/0065335 A1* | 5/2002 | Noguchi | C09D 11/30 522/84 |
| 2005/0191443 A1* | 9/2005 | Sunagawa | B41M 5/52 428/32.29 |
| 2008/0204538 A1* | 8/2008 | Kovacs | C09D 11/101 347/102 |
| 2010/0209611 A1* | 8/2010 | Ohshima | B41J 2/1634 427/256 |
| 2017/0136785 A1* | 5/2017 | Katoh | B05D 1/02 |
| 2017/0233595 A1* | 8/2017 | Erdodi | C09D 11/037 428/201 |
| 2018/0326770 A1* | 11/2018 | Willems | C09D 11/38 |

* cited by examiner

*Primary Examiner* — Christopher M Polley
(74) *Attorney, Agent, or Firm* — Greenblum & Bernstein, P.L.C.

(57) ABSTRACT

A primer for inkjet printing includes one or more aqueous resin(s) and hydrophobic particles having a particle size of 0.05 μm to 15 μm and a melting point of 80° C. to 100° C. The primer improves abrasive resistance properties of an inkjet ink printed on a printed material.

20 Claims, 3 Drawing Sheets

PRIMER FOR INKJET AND METHOD FOR MANUFACTURING A PRINTED MATERIAL

BACKGROUND OF THE INVENTION

1. Field of the Invention

The present invention relates to a primer for an inkjet and manufacturing method for a printed material using the primer.

2. Background

Methods for using inkjet ink printed on surfaces including coated paper and non-coated paper have been widely used.

In a conventional method for using inkjet ink on coated paper, the inkjet ink is typically repelled or smeared, which results in poor image quality. This effect is dependent upon the compatibility of the clay and the binder with the inkjet ink and by various formulations of the paper coating agent.

In a conventional method for using inkjet ink on non-coated paper, the ink penetrates in the back of the paper immediately after the inkjet ink is printed. Moreover, lamp irradiation, which occurs later in the process, does not reach the penetrated ink. As a result, the ink remains on the inside of the paper without being cured. Thus, problems related to the conventional method for using a inkjet on non-coated paper include odor from monomers, stains due to uncured ink, and lack of surface gloss.

Also, problems related to conventional methods for using inkjet ink include clogging which occurs when hydrophobic particles (wax) having a particle size of 0.5 μm or more are introduced into the inkjet ink. Accordingly, conventional methods for using inkjet ink require using hydrophobic particles having a particle size of 0.5 μm or less in the inkjet ink. Thus, it is not possible to achieve abrasive resistance properties of a printed material by mixing in hydrophobic particles (wax) having a particle size of 0.5 μm or more.

SUMMARY OF THE INVENTION

The primer according to the present disclosure is provided to solve the above problems. The primer of the present disclosure includes a mixture of one or more aqueous resin(s) and hydrophobic particles having a particle size of 0.05 μm to 15 μm. In a preferred embodiment, no ink is present in the primer. In another embodiment, the primer directly or indirectly contacts an image forming layer, which is printed by an inkjet ink.

After applying the primer of the present disclosure on coated paper, the physical properties of the paper surface are more uniform and a stable image results due to the compatibility between the primer and the inkjet ink. This effect occurs regardless of the coating agent on the paper surface.

In addition, after applying the primer of the present disclosure on non-coated paper, the inkjet ink remains fixed on the porous paper surface. Therefore, the inkjet ink can be firmly dried even when non-coated paper is used. When UV inkjet ink is used, the UV inkjet ink can be firmly UV cured even when non-coated paper is used. Furthermore, the gloss of the ink can be evenly distributed on the non-coated paper because the inkjet ink forms a thick layer on the surface layer and does not penetrate deep into the paper.

The primer of the present disclosure is capable of providing abrasion resistance to the printing surface.

BRIEF DESCRIPTION OF THE DRAWINGS

The foregoing and other objects, features and advantages of the present disclosure will become more apparent from the following detailed description when taken in conjunction with the accompanying drawings in which.

DETAILED DESCRIPTION OF THE PREFERRED EMBODIMENTS

Figure 1:
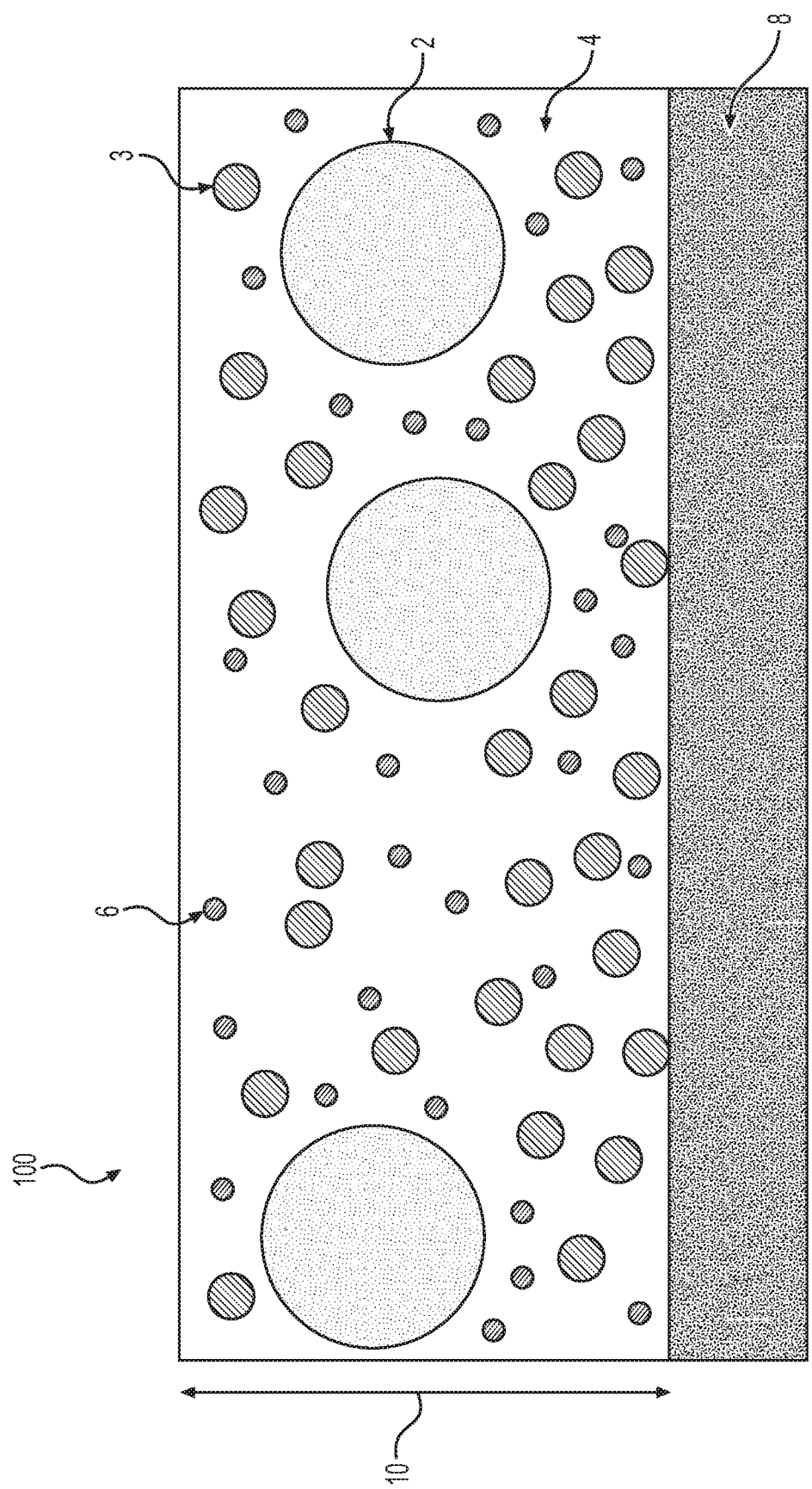
FIG. 1 is a schematic view showing a cross-section of a printed material before drying, including a primer coated onto a base material.

As shown in FIG. 1, large hydrophobic particles 2 are distributed throughout a primer 10 that is coated onto a base material 8 of a printed material 100 before drying. In a preferred embodiment, large hydrophobic particles 2 are distributed within a resin coating layer 4. In another embodiment, large hydrophobic particles 2 and small hydrophobic particles 3 are distributed within the resin coating layer 4. The resin coating layer 4 may optionally include filler particles 6, which suppress large hydrophobic particles 2 and small hydrophobic particles 3 from contacting the base material 8. The primer 10 before drying has a wet coating weight of 2 $g/cm^2$ to 50 $g/cm^2$. In another embodiment, the primer 10 before drying has a wet coating weight of 2 $g/cm^2$ to 20 $g/cm^2$. In yet another embodiment, the primer 10 before drying has a wet coating weight of 4 $g/cm^2$ to 15 $g/cm^2$.

Figure 2:
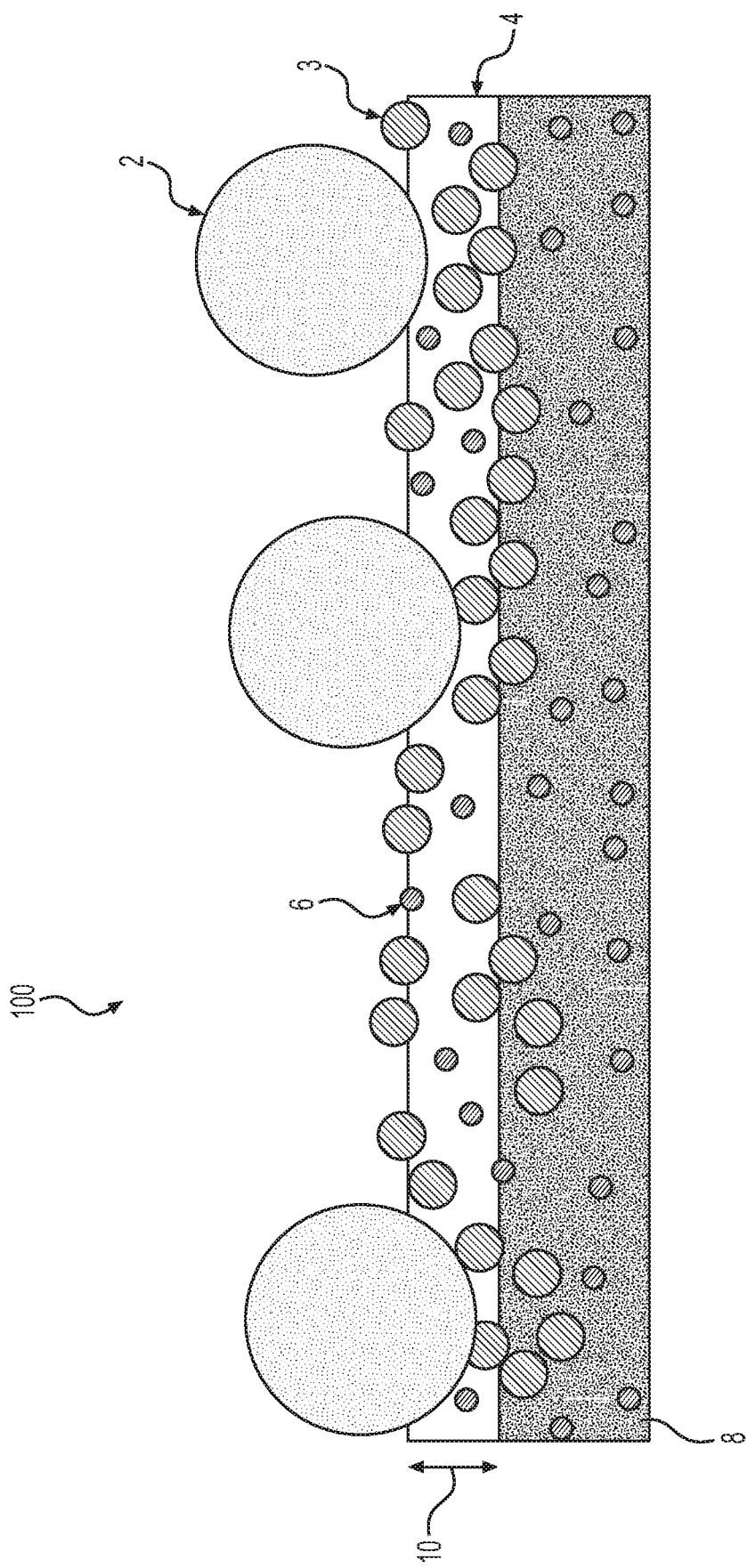
FIG. 2 is a schematic view showing a cross-section of a printed material after drying, including a primer coated onto a base material.

As shown in FIG. 2, large hydrophobic particles 2 are distributed throughout the primer 10 that is coated onto a base material 8 of a printed material 100 after drying. In a preferred embodiment, large hydrophobic particles 2 are distributed within a resin coating layer 4 and partially protrude from the surface of the resin coating layer 4. In another embodiment, large hydrophobic particles 2 and small hydrophobic particles 3 are distributed within the resin coating layer 4. In yet another embodiment, a portion of the small hydrophobic particles 3 partially protrude from the surface of the resin coating layer 4. The resin coating layer 4 may optionally include filler particles 6, which suppress the large hydrophobic particles 2 and small hydrophobic particles 3 from contacting the base material 8. The primer 10 after drying has a wet coating weight of 1 $g/cm^2$ to 25 $g/cm^2$.

Figure 3:
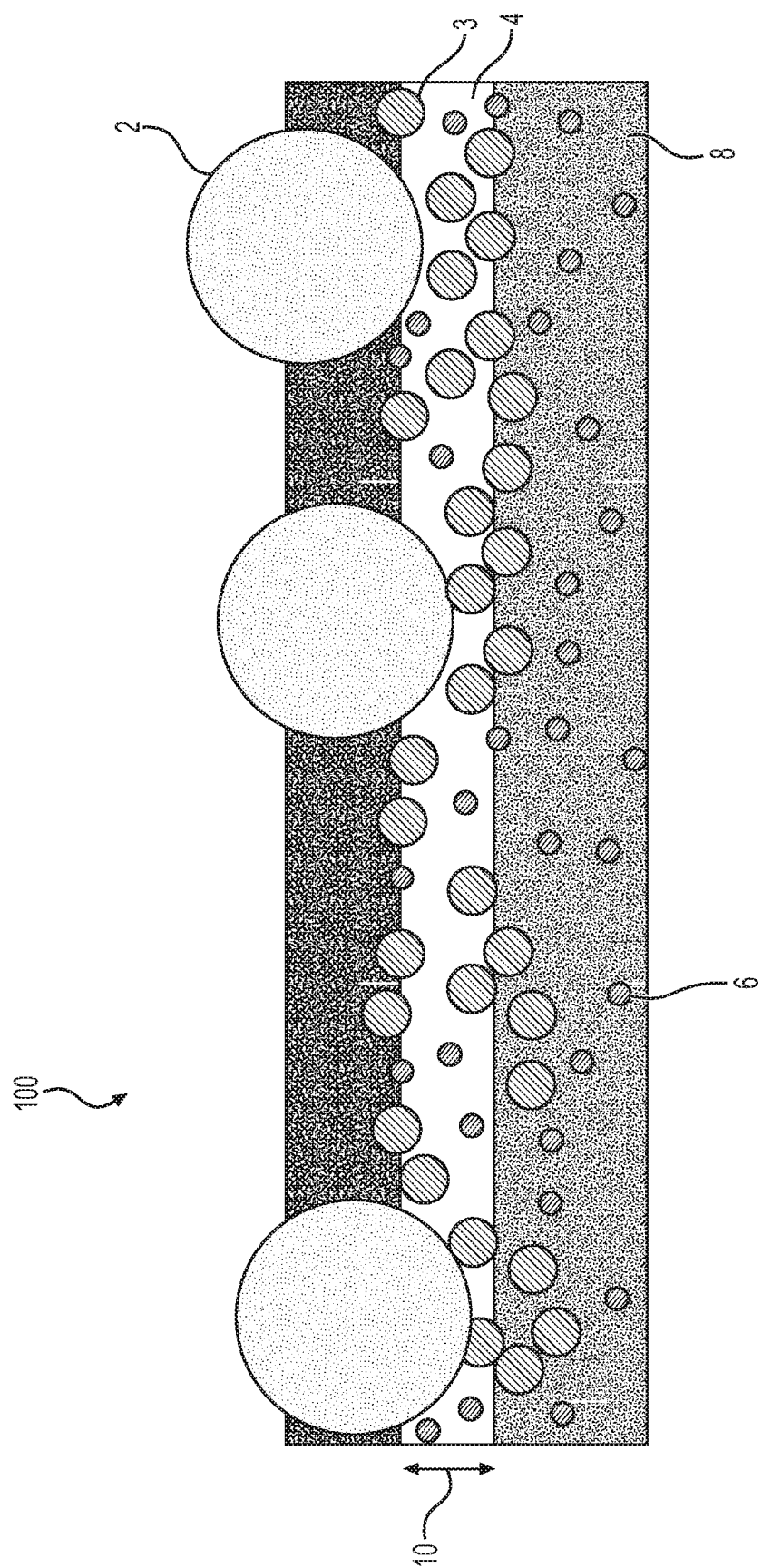
FIG. 3 is a schematic view showing a cross-section of a printed material after drying and printing with ink.

As shown in FIG. 3, large hydrophobic particles 2 are distributed throughout the primer 10 that is coated onto a base material 8 of a printed material 100 after drying and printing with ink 50. In a preferred embodiment, large hydrophobic particles 2 are distributed within a resin coating layer 4 and partially protrude from the surface of the ink 50. In another embodiment, large hydrophobic particles 2 and small hydrophobic particles 3 are distributed within the resin coating layer 4. In yet another embodiment, small hydrophobic particles 3 are distributed within the base material 8. In another embodiment, a portion of the small hydrophobic particles 3 partially protrude from the surface of the resin coating layer 4. The resin coating layer 4 may optionally include filler particles 6, which suppress the large hydrophobic particles 2 and small hydrophobic particles 3 from contacting the base material 8. The primer 10 after drying has a wet coating weight of 1 $g/cm^2$ to 25 $g/cm^2$, and the ink 50 has a wet coating weight of 0 $g/cm^2$ to 25 $g/cm^2$ after printing. In another embodiment, the ink 50 has a wet coating weight of 1 $g/cm^2$ to 10 $g/cm^2$.

The primer coating film or primer 10 according to the present invention improves abrasion resistance, adhesiveness, image formation, washability and stableness as compared to a conventional primer.

According to an aspect of the present invention, a primer 10 for inkjet printing is provided, which comprises (a) a resin coating layer 4 composed of one or more aqueous resins; (b) large hydrophobic particles 2 and/or small hydrophobic particles 3 distributed throughout the resin coating layer 4; and (c) optionally filler particles 6.

In a preferred embodiment of the present invention, large hydrophobic particles 2 are distributed throughout the resin coating layer 4. According to a preferred aspect of the present invention, large hydrophobic particles 2 partially protrude from the surface of the resin coating layer 4 and are embedded within the resin coating layer 4. According to another aspect of the present invention, large hydrophobic particles 2 are only embedded within the resin coating layer 4. According to yet another aspect of the present invention, large hydrophobic particles 2 only partially protrude from the surface of the resin coating layer 4.

The large hydrophobic particles 2 preferably having a particle size of 4 μm to 15 μm, and more preferably a particle size of 6 μm to 10 μm. When the particle size is less than 0.05 μm, the large hydrophobic particles 2 are too small to sufficiently cover the surface, and the abrasion resistance becomes poor. When the particle size is greater than 15 μm or more, printing quality is reduced.

The small hydrophobic particles 3 preferably having a particle size of 0.05 μm to 1.0 μm. When the particle size is less than 0.05 μm, the small hydrophobic particles 3 are too small to sufficiently cover the surface, and the abrasion resistance becomes poor. When the particle size is greater than 15 μm or more, printing quality is reduced. The small hydrophobic particles 3 enhance the slip property where the ink is not present and improve the abrasion resistance.

To determine particle size, a Coulter Multisizer was used, as described in beckman.com/cell-counters-and-analyzers/multisizer-3/features and 2.basf.us/additives/pdfs/luwax_af_ES1188e.pdf.

Further, the small hydrophobic particles 3 have the following functions depending upon whether uncoated paper or coated paper is used as the base material 8. For uncoated paper, the small hydrophobic particles 3 act as a stop agent to inhibit the large hydrophobic particles 3 from contacting inside the base material 8. For coated paper, the small hydrophobic particles 3 block the large hydrophobic particles 2 from being completely embedded into the resin layer 4. As a result, the large hydrophobic particles 2 are able to partially protrude from the ink 50 based upon the presence of the small hydrophobic particles 3.

The large hydrophobic particles 2 and small hydrophobic particles 3 preferably have a melting point of 80° C. to 160° C. When the melting point is less than 80° C., melting occurs during the printing process (drying), and the abrasion resistance becomes poor.

Non-limiting examples of such large hydrophobic particles 2 and small hydrophobic particles 3 include a frame of polyethylene, a modified polyethylene, polypropylene, or a combination thereof. A "modified polyethylene" refers to polyethylene modified with peroxide and/or other modification compounds.

The large hydrophobic particles 2 and/or and small hydrophobic particles 3 are present in the resin coating layer 4, preferably in a blend ratio of 10 wt % to 50 wt % with respect to resin solid content. When the blend ratio is less than 10 wt %, the large hydrophobic particles 2 may not sufficiently cover the surface, and the abrasion resistance may become poor. When the blend ratio is 50 wt % or more, poor film formation may occur.

In another aspect of the present invention, a resin coating layer 4 is formed over the surface of a base material 8. The resin coating layer 4 is comprised of one or more aqueous resins.

There is no particular limitation in the one or more aqueous resin(s) that may be used, as long as they have an acid value of 50 to 150 mgKOH/g. An acid value that is 50 mgKOH/g or less may cause the coating film to stick, which results in poor abrasion resistance. An acid value that is 150 mgKOH/g or more may cause the coating film to become too hard and the large hydrophobic particles 2 and/or small hydrophobic particles 3 may detach, thereby resulting in poor abrasion resistance.

The one or more aqueous resin(s) preferably has a glass transition temperature (Tg) of −70° C. to 40° C., and more preferably, −70° C. to 10° C. When the one or more aqueous resin(s) has a Tg of −70° C. or lower, the coating film sticks and the abrasion resistance may become poor. When the one or more aqueous resin(s) has a Tg of 10° C. or higher, the coating film may become too hard and the large hydrophobic particles 2 and/or small hydrophobic particles 3 may detach, thereby resulting in poor abrasion resistance.

Non-limiting examples of the aqueous resins include an anionic resin or a cationic resin.

The anionic resin is not particularly limited when the resin has an anionic functional group which can exhibit an anionic character in that presence of a counter ion, and synthetic or natural resins are usable as the anionic resin. Examples thereof include resins having a carboxyl group as the anionic functional group, specifically synthetic resins such as ethylene-(meth)acrylic acid copolymer resins, vinyl acetate-(meth)acrylic acid copolymer resins, (meth)acrylate ester-(meth)acrylic acid copolymer resins, styrene-(meth)acrylic acid copolymer resins, styrene-butadiene copolymer resins, styrene-maleic anhydride copolymer resins, carboxyl-group-containing urethane resins, and carboxyl-group-containing polyester resins, and natural resins, such as carboxymethyl cellulose. These may be used either alone or in combination. In addition, the form of these anionic resins when used is not particularly limited, and may be either in an aqueous solution or a water dispersion (i.e., an emulsion).

The cationic resin is not particularly limited when the resin has a cationic functional group which can exhibit cationic character in the presence of a counter ion. Examples thereof include resins which have an amino group as the cationic functional group, such as basic nitrogen-containing resins, such as polyalkylenimines, polyamides, aminosulfopolyesters, polyallylamines, polyvinylamines, and modified polymers thereof.

In one embodiment, the polyalkylenimine is produced by a process including a step of ionically polymerizing an alkylenimine, such as ethylenimine, propylenimine, 1,2-dodecylenimine, 1,1-dimethylethylenimine, phenylethylenimine, benzylethylenimine, hydroxylethylethylenimine, aminoethylethylenimine, 2-methylpropylenimine, 3-chloropropylethylenimine, methoxyethylethylenimine, dodecylaziridinyl formate, N-ethylethylenimine, N-(2-aminoethyl)ethylenimine, N-phenethylethylenimine, N-(2-hydroxyethyl)ethylenimine, N-(cyanoethyl)ethylenimine, or N-(p-chlorophenyl)ethylenimine, or by a process including the steps of polymerizing an alkyloxazoline, and then partially or entirely hydrolyzing the resultant polymer. However, the present disclosure is not limited to this embodiment.

Another component in the primer are filler particles 6. Non-limiting examples of filler particles 6 include silica, titanium oxide, aluminum oxide, calcium carbonate, or combinations thereof. When the filler particles 6 are used in the primer, the filler particles 6 can suppress the large hydrophobic particles 2 from contacting a base material 8. Therefore, the filler particles 6 improve the quality of the primer as compared to conventional printed materials.

Silica is preferably used as a filler particle 6 because it has a heavy specific gravity that sinks to the bottom, thereby suppressing the large hydrophobic particles 2 from sinking. Therefore, large hydrophobic particles 2 are likely to float to the surface of the resin coating layer 4 when silica is used.

According to another aspect of the present disclosure, there is provided a method for manufacturing a printed material, which includes: (a) applying and drying a solution containing one or more aqueous resins and optionally one or more filler particle 6 onto a base material 8; and (b) applying and drying another solution containing one or more large hydrophobic particles 2 (or resin and wax) and/or one or more small hydrophobic particles 3 onto the resin coating layer 4.

The primer 10 is applied to the surface of the printed base material 8 by flexo or gravure printing method or any method, and then dried by a dryer. The primer 10 preferably has a wet coating weight of 2 to 50 g/cm². After drying, inkjet ink is discharged from the inkjet head to form an image on the surface of the primer-coated printing base material 8. However, the present disclosure is not limited to inkjet ink, and thus UV inkjet ink may be used. When UV inkjet ink is used, the ink is then cured using a UV lamp, including LED, mercury lamp, or metal doped lamp. An example of a metal doped lamp includes a gallium lamp.

The printed material preferably has a slip angle of 10° to 20°. The term "slip angle" refers to the angle from the horizontal plane in which a weighted paper sample slides on the surface of another paper sample.

A variety of base materials 8 can be used. In a preferred example, the base material 8 includes cardboard. However, the base material is not limited to cardboard, and a plastic base material may be used. The cardboard base material is generally composed of two portions: a flute and a liner. The flute is folded into the interior of the cardboard base for the purposes of enhancing strength. The liner is situated at the surface of the cardboard base.

The print quality of the present invention relates to the properties of the surface of the base material 8, referred to as the "liner." In one embodiment, the liner is coated paper. Coated paper is obtained by applying a paint made by mixing a white pigment, such as clay (kaolin), and calcium carbonate and an adhesive (binder), such as starch, onto a non-coated paper. Therefore, the smoothness of the paper is enhanced for a desirable design. Also, by applying a paint, no gap occurs on the paper surface. Therefore, when ink is applied, the ink does not penetrate in the interior of the paper and remains on the surface.

In another embodiment, the liner is non-coated paper. Non-coated paper refers to paper which has not been surface-coated and includes a fiber surface as the top layer. The non-coated paper is in a porous state. Therefore, when an ink, such as an inkjet, having a low viscosity is applied, the ink immediately penetrates in the interior of the paper, and the amount of ink remaining on the surface is smaller than that of the coated paper.

The base material 8 may further comprise an image forming layer. In one embodiment, the image forming layer is printed by an inkjet ink. In another embodiment, the inkjet ink is a UV curing-type inkjet ink. When the UV curing-type inkjet ink is used, it is preferable that the UV-curing type inkjet ink has a wet coating weight of 0 to 25 g/m².

EXAMPLES

Hereinafter, the present disclosure will be more specifically described with reference to Examples. It is to be understood that the following examples are illustrative only and the present disclosure is not limited thereto.

Example 1

9 wt % of wax 1 (particle size of 6 μm, melting point of 11.0° C., and PE main frame), 57.5 wt % of resin 1 (acid value of 90 mgKOH/g and Tg of −33° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 1 were tested for abrasion resistance, adhesiveness, image formation, washability, and stableness. The results are shown in Table 8.

Example 2

9 wt % of wax 3 (particle size of 8 μm, melting point of 97° C., and PE main frame), 57.5 wt % of resin 1 (acid value of 90 mgKOH/g and Tg of −33° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 2 were tested for abrasion resistance, adhesiveness, image formation, washability, and stableness. The results are shown in Table 8.

Example 3

9 wt % of wax 4 (particle size of 0.08 μm, melting point of 130° C., and PE main frame), 57.5 wt % of resin 1 (acid value of 90 mgKOH/g and Tg of −33° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 3 were tested for abrasion resistance, adhesiveness, image formation, washability, and stableness. The results are shown in Table 8.

Example 4

9 wt % of wax 6 (particle size of 3.5 μm, melting point of 140° C., and modified PE main frame), 57.5 wt % of resin 1 (acid value of 90 mgKOH/g and Tg of −33° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 4 were tested for abrasion resistance, adhesiveness, image formation, washability, and stableness. The results are shown in Table 8.

Example 5

4 wt % of wax 3 (particle size of 8 μm, melting point of 97° C., and PE main frame), 57.5 wt % of resin 1 (acid value of 90 mgKOH/g and Tg of −33° C.), 7 wt % of silica 1 (particle size of 4 μm), and 31.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 5 were tested for abrasion resistance, adhesiveness, image formation, washability, and stableness. The results are shown in Table 8.

Example 6

2 wt % of wax 3 (particle size of 8 μm, melting point of 97° C., and PE main frame), 57.5 wt % of resin 1 (acid value of 90 mgKOH/g and Tg of −33° C.), 7 wt % of silica 1 (particle size of 4 μm), and 33.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 6 were tested for abrasion resistance, adhesiveness, image formation, washability, and stableness. The results are shown in Table 8.

Example 7

1 wt % of wax 3 (particle size of 8 μm, melting point of 97° C., and PE main frame), 57.5 wt % of resin 1 (acid value of 90 mgKOH/g and Tg of −33° C.), 7 wt % of silica 1 (particle size of 4 μm), and 34.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 7 were tested for abrasion resistance, adhesiveness, image formation, washability, and stableness. The results are shown in Table 8.

Example 8

0.5 wt % of wax 3 (particle size of 8 μm, melting point of 97° C., and PE main frame), 57.5 wt % of resin 1 (acid value of 90 mgKOH/g and Tg of −33° C.), 7 wt % of silica 1 (particle size of 4 μm), and 35 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer coated paper printing base material. Then, the ink was cured using a UV lamp (LED, mercury lamp, metal doped lamp, e.g., gallium lamp) to manufacture the printed material (after primer application).

The printed material (after primer application) obtained in Example 8 were tested for abrasion resistance, adhesiveness, image formation, washability, and stableness. The results are shown in Table 8.

Example 9

4 wt % of wax 1 (particle size of 6 μm, melting point of 110° C., and PE main frame), 5 wt % of wax 2 (particle size of 8 μm, melting point of 110° C., and PE main frame), 57.5 wt % of resin 1 (acid value of 90 mgKOH/g and Tg of −33° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 9 were tested for abrasion resistance, adhesiveness, image formation, washability, and stableness. The results are shown in Table 8.

Example 10

4 wt % of wax 1 (particle size of 6 μm, melting point of 110° C., and PE main frame), 5 wt % of wax 3 (particle size of 8 μm, melting point of 97° C., and PE main frame), 57.5 wt % of resin 1 (acid value of 90 mgKOH/g and Tg of −33° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 10 were tested for abrasion resistance, adhesiveness, image formation, washability, and stableness. The results are shown in Table 8.

Example 11

4 wt % of wax 1 (particle size of 6 μm, melting point of 110° C., and PE main frame), 5 wt % of wax 4 (particle size of 0.08 μm, melting point of 130° C., and PE main frame), 57.5 wt % of resin 1 (acid value of 90 mgKOH/g and Tg of −33° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 11 were tested for abrasion resistance, adhesiveness, image formation, washability, and stableness. The results are shown in Table 9.

Example 12

4 wt % of wax 1 (particle size of 6 μm, melting point of 110° C., and PE main frame), 5 wt % of wax 5 (particle size of 0.075 μm, melting point of 135° C., and PE main frame), 57.5 wt % of resin 1 (acid value of 90 mgKOH/g and Tg of −33° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material, by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 12 were tested for abrasion resistance, adhesiveness, image formation, washability, and stableness. The results are shown in Table 9.

Example 13

5 wt % of wax 5 (particle size of 0.075 μm, melting point of 135° C., and PE main frame), 4 wt % of wax 7 (particle size of 5 μm, melting point of 111° C., and PE carnaba alloy main frame), 57.5 wt % of resin 1 (acid value of 90 mgKOH/g and Tg of −33° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 13 were tested for abrasion resistance, adhesiveness, image formation, washability, and stableness. The results are shown in Table 9.

Example 14

5 wt % of wax 5 (particle size of 0.075 μm, melting point of 135° C., and PE main frame), 4 wt % of wax 8 (particle size of 15 μm, melting point of 160° C., and PP series main frame), 57.5 wt % of resin 1 (acid value of 90 mgKOH/g and Tg of −33° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 14 were tested for abrasion resistance, adhesiveness, image formation, washability, and stableness. The results are shown in Table 9.

Example 15

4 wt % of wax 1 (particle size of 6 μm, melting point of 110° C., and PE main frame), 5 wt % of wax 4 (particle size of 0.08 μm, melting point of 130° C., and PE main frame), 57.5 wt % of resin 2 (acid value of 65 mgKOH/g and Tg of −33° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a non-coated paper printing base material by a flexo or a gravure printing method (any method will suffice), and dried by a dryer. After drying, the UV inkjet ink was discharged from the inkjet head to form an image on the surface of the primer-coated non-coated paper printing base material. Then, the ink was cured using a UV lamp (LED, mercury lamp, metal doped lamp, e.g., gallium lamp) to manufacture the printed material (after primer application).

The printed material (after primer application) obtained in Example 15 were tested for abrasion resistance, adhesiveness, image formation, washability, and stableness. The results are shown in Table 9.

Example 16

4 wt % of wax 1 (particle size of 6 μm, melting point of 110° C., and PE main frame), 5 wt % of wax 4 (particle size of 0.08 μm, melting point of 130° C., and PE main frame), 57.5 wt % of resin 3 (acid value of 130 mgKOH/g and Tg of 19° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a non-coated paper printing base material by a flexo or a gravure printing method (any method will suffice), and dried by a dryer. After drying, the UV inkjet ink was discharged from the inkjet head to form an image on the surface of the primer-coated non-coated paper printing base material. Then, the ink was cured using a UV lamp (LED, mercury lamp, metal doped lamp, e.g., gallium lamp) to manufacture the printed material (after primer application).

The printed material (after primer application) obtained in Example 16 were tested for abrasion resistance, adhesiveness, image formation, washability, and stableness. The results are shown in Table 9.

Example 17

4 wt % of wax 1 (particle size of 6 μm, melting point of 110° C., and PE main frame), 5 wt % of wax 4 (particle size of 0.08 μm, melting point of 130° C., and PE main frame), 57.5 wt % of resin 4 (acid value of 87 mgKOH/g and Tg of −5° C.), 7 wt % of silica 1 (particle size of 4 μm), and 26.5 wt. % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a non-coated paper printing base material by a flexo or a gravure printing method (any method will suffice), and dried by a dryer. After drying, the UV inkjet ink was discharged from the inkjet head to form an image on the surface of the primer-coated non-coated paper printing base material. Then, the ink was cured using a UV lamp (LED, mercury lamp, metal doped lamp, e.g., gallium lamp) to manufacture the printed material (after primer application).

The printed material (after primer application) obtained in Example 17 were tested for abrasion resistance, adhesiveness, image formation, washability, and stableness. The results are shown in Table 9.

Example 18

4 wt % of wax 1 (particle size of 6 μm, melting point of 110° C., and PE main frame), 5 wt % of wax 4 (particle size of 0.08 μm, melting point of 130° C., and PE main frame), 57.5 wt % of resin 5 (acid value of 157 mgKOH/g and Tg of 39° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a non-coated paper printing base material by a flexo or a gravure printing method (any method will suffice), and dried by a dryer. After drying, the LTV inkjet ink was discharged from the inkjet head to form an image on the surface of the primer-coated non-coated paper printing base material. Then, the ink was cured using a LTV lamp (LED, mercury lamp, metal doped lamp, e.g., gallium lamp) to manufacture the printed material (after primer application).

The printed material (after primer application) obtained in Example 18 were tested for abrasion resistance, adhesiveness, image formation, washability, and stableness. The results are shown in Table 9.

Example 19

4 wt % of wax 1 (particle size of 6 μm, melting point of 110° C., and PE main frame), 5 wt % of wax 4 (particle size of 0.08 μm, melting point of 130° C., and PE main frame), 57.5 wt % of resin 6 (acid value of 30 mgKOH/g and Tg of 14° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a non-coated paper printing base material by a flexo or a gravure printing method (any method will suffice), and dried by a dryer. After drying, the UV inkjet ink was discharged from the inkjet head to form an image on the surface of the primer-coated non-coated paper printing base material. Then, the ink was cured using a UV lamp (LED, mercury lamp, metal doped lamp, e.g., gallium lamp) to manufacture the printed material (after primer application).

The printed material (after primer application) obtained in Example 19 were tested for abrasion resistance, adhesiveness, image formation, washability, and stableness. The results are shown in Table 9.

Example 20

4 wt % of wax 1 (particle size of 6 μm, melting point of 110° C., and PE main frame), 5 wt % of wax 4 (particle size of 0.08 μm, melting point of 130° C., and PE main frame), 57.5 wt % of resin 7 (acid value of 128 mgKOH/g and Tg of 25° C.), 7 wt % of silica 1 (particle size of 4 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a non-coated paper printing base material by a flexo or a gravure printing method (any method will suffice), and dried by a dryer. After drying, the UV inkjet ink was discharged from the inkjet head to form an image on the surface of the primer-coated non-coated paper printing base material. Then, the ink was cured using a UV lamp (LED, mercury lamp, metal doped lamp, e.g., gallium lamp) to manufacture the printed material (after primer application).

The printed material (after primer application) obtained in Example 20 were tested for abrasion resistance, adhesiveness, image formation, washability, and stableness. The results are shown in Table 9.

Example 21

4 wt % of wax 1 (particle size of 6 μm, melting point of 110° C., and PE main frame), 5 wt % of wax 4 (particle size of 0.08 μm, melting point of 130° C., and PE main frame), 57.5 wt % of resin 1 (acid value of 90 mgKOH/g and Tg of −33° C.), 7 wt % of silica 2 (particle size of 2 μm), and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 21 were tested for abrasion resistance, adhesiveness, image formation, washability, and stableness. The results are shown in Table 10.

Example 22

4 wt % of wax 1 (particle size of 6 μm, melting point of 110° C., and PE main frame), 5 wt % of wax 4 (particle size of 0.08 μm, melting point of 130° C., and PE main frame), 57.5 wt % of resin 1 (acid value of 90 mgKOH/g and Tg of −33° C.), and 33.5 wt % of water as the solvent were stirred for about 1 hour with a mixer until the solid content was well mixed. Then, filtration was performed with a mesh filter of 100 μm in order to manufacture the primer solution.

After applying and drying a solution containing resin, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 22 were tested for abrasion resistance, adhesiveness, image formation, washability, and stableness. The results are shown in Table 10.

Example 23

4 wt % of wax 1 (particle size of 6 μm, melting point of 110° C., and PE main frame), 5 wt % of wax 4 (particle size of 0.08 μm, melting point of 130° C., and PE main frame), 52.5 wt % of resin 1 (acid value of 90 mgKOH/g and Tg of −33° C.), 5 wt % of resin 3 (acid value of 130 mgKOH/g and Tg of 19° C.), 7 wt % of silica 1 (particle size of 4 μm) and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 23 were tested for abrasion resistance, adhesiveness, image formation, washability, and stableness. The results are shown in Table 10.

Example 24

2 wt % of wax 1 (particle size of 6 melting point of 110° C., and PE main frame), 10 wt % of wax 4 (particle size of 0.08 μm, melting point of 130° C., and PE main frame), 31 wt % of resin 2 (acid value of 65 mgKOH/g and Tg of −33° C.), 31 wt % of resin 4 (acid value of 87 mgKOH/g and Tg of −5° C.), 6 wt % of silica 1 (particle size of 4 μm) and 20 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 24 were tested for abrasion resistance, adhesiveness, image formation, washability, and stableness. The results are shown in Table 10.

Example 25

5 wt % of wax 4 (particle size of 0.08 μm, melting point of 130° C., and PE main frame), 33 wt % of resin 1 (acid value of 90 mgKOH/g and Tg of −33° C.), 33 wt % of resin 4 (acid value of 87 mgKOH/g and Tg of −5° C.), 8 wt % of silica 1 (particle size of 4 μm) and 21 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 25 were tested for abrasion resistance, adhesiveness, image formation, washability, and stableness. The results are shown in Table 10.

Example 26

10 wt % of wax 1 (particle size of 6 μm, melting point of 110° C., and PE main frame), 10 wt % of wax 4 (particle size of 0.08 μm, melting point of 130° C., and PE main frame), 30 wt % of resin 1 (acid value of 90 mgKOH/g and Tg of −33° C.), 30 wt % of resin 4 (acid value of 87 mgKOH/g and Tg of −5° C.), 8 wt % of silica 1 (particle size of 4 μm) and 12 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 26 were tested for abrasion resistance, adhesiveness, image formation, washability, and stableness. The results are shown in Table 10.

Example 27

2 wt % of wax 1 (particle size of 6 μm, melting point of 110° C., and PE main frame), 5 wt % of wax 4 (particle size of 0.08 μm, melting point of 130° C., and PE main frame), 33 wt % of resin 2 (acid value of 65 mgKOH/g and Tg of −33° C.), 33 wt % of resin 4 (acid value of 87 mgKOH/g and Tg of −5° C.), 6 wt % of silica 1 (particle size of 4 μm) and 21 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 27 were tested for abrasion resistance, adhesiveness, image formation, washability, and stableness. The results are shown in Table 10.

Example 28

4 wt % of wax 1 (particle size of 6 μm, melting point of 110° C., and PE main frame), 5 wt % of wax 4 (particle size of 0.08 μm, melting point of 130° C., and PE main frame), 33 wt % of resin 2 (acid value of 65 mgKOH/g and Tg of −33° C.), 33 wt % of resin 4 (acid value of 87 mgKOH/g and Tg of −5° C.), 4 wt % of silica 1 (particle size of 4 μm) and 21 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 28 were tested for abrasion resistance, adhesiveness, image formation, washability, and stableness. The results are shown in Table 10.

Example 29

3.5 wt % of wax 4 (particle size of 0.08 μm, melting point of 130° C., and PE main frame), 1.5 wt % of wax 7 (particle size of 5 μm, melting point of 111° C., and PE carnaba alloy main frame), 22 wt % of resin 2 (acid value of 65 mgKOH/g and Tg of −33° C.), 5 wt % of resin 3 (acid value of 130 mgKOH/g and Tg of 19° C.), 48 wt % of resin 5 (acid value of 157 mgKOH/g and Tg of 39° C.), 1.5 wt % of silica 1 (particle size of 4 μm) and 18.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Example 29 were tested for abrasion resistance, adhesiveness, image formation, washability, and stableness. The results are shown in Table 10.

Comparative Example 1

9 wt % of comparative wax 1 (particle size of 18 μm, melting point of 160° C., and PP series main frame), 57.5 wt % of resin 1 (acid value of 90 mgKOH/g and Tg of −33° C.), 7 wt % of silica 1 (particle size of 4 μm) and 26.5 wt % of water as the solvent were stirred for about 1 hour with a mixer until the solid content was well mixed. Then, filtration was performed with a mesh filter of 100 μm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Comparative Example 1 were tested for abrasion resistance, adhesiveness, image formation, washability, and stableness. The results are shown in Table 11.

Comparative Example 2

9 wt % of comparative wax 2 (particle size of 20 µm, melting point of 75° C., and amide main frame), 57.5 wt % of resin 1 (acid value of 90 mgKOH/g and Tg of −33° C.), 7 wt % of silica 1 (particle size of 4 µm) and 26.5 wt % of water as the solvent were stirred for about 1 hour with a mixer until the solid content was well mixed. Then, filtration was performed with a mesh filter of 100 µm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Comparative Example 2 were tested for abrasion resistance, adhesiveness, image formation, washability, and stableness. The results are shown in Table 11.

Comparative Example 3

9 wt % of comparative wax 3 (particle size of 5 µm, melting point of 175° C., and modified organic polymer main frame), 57.5 wt % of resin 1 (acid value of 90 mgKOH/g and Tg of −33° C.), 7 wt % of silica 1 (particle size of 4 µm) and 26.5 wt % of water as the solvent were stirred for about 1 hour with a mixer until the solid content was well mixed. Then, filtration was performed with a mesh filter of 100 µm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Comparative Example 3 were tested for abrasion resistance, adhesiveness, image formation, washability, and stableness. The results are shown in Table 11.

Comparative Example 4

9 wt % of comparative wax 1 (particle size of 18 µm, melting point of 160° C., and PP series main frame), 33 wt % of resin 2 (acid value of 65 mgKOH/g and Tg of −33° C.), 33 wt % of resin 4 (acid value of 87 mgKOH/g and Tg of −5° C.), 6 wt % of silica 1 (particle size of 4 µm) and 19 wt % of water as the solvent were stirred for about 1 hour with a mixer until the solid content was well mixed. Then, filtration was performed with a mesh filter of 100 µm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Comparative Example 4 were tested for abrasion resistance, adhesiveness, image formation, washability, and stableness. The results are shown in Table 11.

Comparative Example 5

9 wt % of comparative wax 2 (particle size of 20 µm, melting point of 75° C., and amide main frame), 33 wt % of resin 2 (acid value of 65 mgKOH/g and Tg of −33° C.), 33 wt % of resin 4 (acid value of 87 mgKOH/g and Tg of −5° C.), 6 wt % of silica 1 (particle size of 4 µm) and 19 wt % of water as the solvent were stirred for about 1 hour with a mixer until the solid content was well mixed. Then, filtration was performed with a mesh filter of 100 µm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Comparative Example 5 were tested for abrasion resistance, adhesiveness, image formation, washability, and stableness. The results are shown in Table 11.

Comparative Example 6

9 wt % of comparative wax 3 (particle size of 5 µm, melting point of 175° C., and modified organic polymer main frame), 33 wt % of resin 2 (acid value of 65 mgKOH/g and Tg of −33° C.), 33 wt % of resin 4 (acid value of 87 mgKOH/g and Tg of −5° C.), 6 wt % of silica 1 (particle size of 4 µm) and 19 wt % of water as the solvent were stirred for about 1 hour with a mixer until the solid content was well mixed. Then, filtration was performed with a mesh filter of 100 µm in order to manufacture the primer solution.

After applying and drying a solution containing resin and silica, the primer was formed by applying and drying a solution containing resin and wax to manufacture the primer portion of the printed material.

The primer was then applied to the surface of a coated paper printing base material by a flexo or a gravure printing method (any method will suffice), and dried by a dryer. After drying, the UV inkjet ink was discharged from the inkjet head to form an image on the surface of the primer-coated paper printing base material. Then, the ink was cured using a UV lamp (LED, mercury lamp, metal doped lamp, e.g., gallium lamp) to manufacture the printed material (after primer application).

The printed material (after primer application) obtained in Comparative Example 6 were tested for abrasion resistance, adhesiveness, image formation, washability, and stableness. The results are shown in Table 11.

The primer and printed material produced in Examples 1-29 and Comparative Examples 1-6 were evaluated as follows:

(1) Abrasion Resistance

A sample was coated with "Miyabar #4" (wet film thickness of 9.16 μm) on the base material. After air drying the coated sample in an oven at 80° C. for 30 minutes, UV inkjet ink was provided over the coated sample by Single Pass inkjet Printer (Model DB400 Inkjet Developing Platform, which is manufactured by Integrity Industrial Ink Jet Integration, LLC). Subsequently, the UV inkjet ink was cured by LED and UV lamp, and evaluated to determine whether sufficiently cured. To evaluate abrasion, a Sutherland™ Ink Rub Tester was used. A substrate face, not a coated primer, was superimposed on the prepared UV ink printed surface and a two-pound weight was placed over the substrate. Then, it was rubbed 50 times to visually observe and evaluate how much ink was removed.

◉ Ink was not transferred to the non-printing base material.
○ Ink transfer surface area to the non-printing base material was within 20%.
Δ Ink transfer surface area to the non-printing base material was within 50% and the printed image quality was slightly affected.
x Ink was significantly transferred to the non-printing base material and the printed image quality was greatly affected.

(2) Adhesiveness

A sample was coated with "Miyabar #4" on the base material, and UV inkjet ink was provided over the coated layer. After UV radiation, the UV ink printing surface was cross-cut, and a peeling test was performed with tape (3M Scotch 610). The extent of Ink removal was visually observed and evaluated.

◉ Tape was peeled with the paper surface, or interface stripping (ink/primer) surface area was 5% or less.
○ Interface stripping (ink/primer) surface area was 20% or less and tape transfer occurred.
Δ Interface stripping (ink/primer) surface area is 50% or less and tape transfer occurred.
x interface stripping (ink/primer) occurred in all regions.

(3) Image Formation

A sample was coated using a 25μ applicator on the base material, and after air drying in an oven at 80° C. for 30 minutes, the UV inkjet ink was provided over the coated layer. Then, the exterior was visually observed and evaluated.

◉ The printed image had no missing portions.
○ In the entire printed image, 20% or less of the surface area had slight missing portions.
Δ In the entire printed image, 50% or less of the surface area had missing portions.
x The image was not formed.
※ Applicator: gardco.com/pages/application/ap/birdtype-app.cfm It was assumed that the missing image formation was due to printing streaks caused by uneven image quality and poor leveling.

(4) Washability

The coating film, obtained from 5 g of the sample and dried, was immersed in water. Then, the dried coating film was rubbed with a Kim Wipe to evaluate the degree of dissolution. It was then visually observed and evaluated.

◉ After being immersed in water for 10 minutes, 50% or more of the coating film surface area easily dissolved.
○ After being immersed in water for 30 minutes, 50% or more of the coating film surface area easily dissolved.
Δ After being immersed in water for 30 minutes, 25%-50% of the coating film surface area dissolved.
x Even after being immersed in water for 30 minutes, the coating film surface area did not dissolve.
*** Other methods for evaluation are permissible. The present disclosure is not limited to using a Kim Wipe.

(5) Stability (Over Time)

After the sample was left in an oven at 40° C. for 1 week, the conditions and viscosity increase were visually examined. The viscosity was measured using EZ Zhan Cup #2, and the viscosity increase was measured starting from the immediate finishing [of printing].

◉ No separation, no settling, and increase in viscosity was within 20%
○ settling, slight separation, but increase in viscosity was within 20%
Δ No settling, slight separation, but increase in viscosity was within 50%
x Settling was observed regardless of separation.

(6) Printing Machine for UV Inkjet (UVIJ)
Manufacturer (Barberan), Type (Jetmaster) world wide web at jetmasterseries.com/

(7) Ink for UVIJ
Ink name (Made by Toyoink, UH010, 020 series), UV radiation condition (Mercury lamp, Gallium lamp, LED)

(8) Types of Base Materials
"Kemi"™ or "mottling white" (MW)
Coated sheet=Kemi™; Uncoated sheet=MW (9) Types of Paper Used
Cardboard boxes are structured with "flute" and "liner" portions.

The "flute" is a weaved/jagged interior portion of a cardboard box. The flute is not related to the printing quality.

The "liner" portion is an exterior portion of a cardboard box.

There are three general types of "liners":
(i) Kraft: brown cardboard
(ii) Mottling White: white cardboard
(iii) Kemi: coated cardboard
(i). Kraft Paper Kraft paper or kraft is paper or paperboard (cardboard) produced from chemical pulp in a kraft process.

Sack kraft paper (or simply sack paper) is a porous kraft paper with high elasticity and high tear resistance, which is designed for packaging products with high demands for strength and durability.

Pulp produced by the kraft process is stronger than that made by other pulping processes involving acidic sulfite processes that enhance cellulose degradation, leading to weaker fibers, and mechanical pulping processes that result in most of the lignin remaining with the fibers. In contrast, kraft pulping removes most of the lignin originally present in the wood. Low lignin is important to the resulting strength of the paper because the hydrophobic nature of lignin interferes with the formation of the hydrogen bonds between cellulose (and hemicellulose) in the fibers.

(ii). Mottling White is Colored to be White

Kraft pulp is darker than other wood pulps, but it can be bleached to produce very white pulp. Fully bleached kraft pulp is used to make high quality paper in applications where strength, whiteness, and resistance to yellowing are important.

(iii). Coated Paper

Coated paper is paper that has been coated by a mixture of materials or a polymer to impart certain qualities to the paper, including weight, surface gloss, smoothness or reduced ink absorbency. Various materials, including Kaolinite, calcium carbonate, Bentonite, and talc can be used to coat paper for high quality printing used in the packaging industry and in magazines. Chalk or china clay is bound to the paper with synthetic viscosifiers, such as styrene-butadiene latexes and natural organic binders, such as starch. The coating formulation may also contain chemical additives as dispersants, resins, or polyethylene to impart water resistance and wet strength to the paper, or to protect against ultraviolet radiation.

(10) Silica/Resin Type Fixed

Depending on the type of wax, abrasion resistance was shown.

The abrasion resistance of liquid wax (Examples 4 and 5) was clearly improved as compared to powder wax. There was no significant improvement in performance for materials other than PE. For materials other than PE, the stability over time may be degraded.

(11) Resin Type Changed, Wax/Silica Fixed

Based on the results from Example 11, the abrasion resistance was ○ for all series.

Washability was ◉, if resin AV was high.

Washability was ◉, if resin Tg was low.

Image formation may be better when Tg is high.

(12) Silica Existence/Type

Improved abrasion resistance occurred by increasing the amount of liquid wax.

In order to make the abrasion resistance of Example 24 to be ◉, others were brought down by 1 rank.

For the mixture series for resin 2 (low Tg/low AV) (Examples 24 and 27-29), the adhesiveness was improved, but the abrasion resistance became poor.

TABLE 1

| | Wax | Particle size | Melting Point | Main frame | NV | Example 1 | Example 2 | Example 3 | Example 4 | Example 5 |
|---|---|---|---|---|---|---|---|---|---|---|
| Primer layer | Wax 1 | 6 | 110 | PE | 100% | 9 | | | | |
| | Wax 2 | 8 | 110 | PE | 100% | | | | | |
| | Wax 3 | 8 | 97 | PE | 100% | | 9 | | | 4 |
| | Wax 4 | 0.08 | 130 | PE | 34% | | | 9 | | |
| | Wax 5 | 0.075 | 135 | PE | 32% | | | | | |
| | Wax 6 | 3.5 | 140 | Modified PE | 100% | | | | 9 | |
| | Wax 7 | 5 | 111 | PE carnaba alloy | 100% | | | | | |
| | Wax 8 | 15 | 160 | PP series | 100% | | | | | |
| | Comparative Wax 1 | 18 | 160 | PP series | 100% | | | | | |
| | Comparative Wax 2 | 20 | 75 | Amide | 100% | | | | | |
| | Comparative Wax 3 | 5 | 175 | Modified organic polymer | 100% | | | | | |
| | Aqueous resin | Acid value | Tg | | | | | | | |
| | Resin 1 | 90 | −33 | | 42% | 57.5 | 57.5 | 57.5 | 57.5 | 57.5 |
| | Resin 2 | 65 | −33 | | 47.30% | | | | | |
| | Resin 3 | 130 | 19 | | 39.50% | | | | | |
| | Resin 4 | 87 | −5 | | 35% | | | | | |
| | Resin 5 | 157 | 39 | | 19.50% | | | | | |
| | Resin 6 | 30 | 14 | | 50% | | | | | |
| | Resin 7 | 128 | 25 | | 41.50% | | | | | |
| | Sillica | Particle size | | | | | | | | |
| | Sillica 1 | 4 | | | 100% | | | | | |
| | Sillica 2 | 2 | | | | 7 | 7 | 7 | 7 | 7 |
| | Solvent | Water | | | | 26.5 | 26.5 | 26.5 | 26.5 | 31.5 |
| | | Total | | | | 100 | 100 | 100 | 100 | 100 |
| Base material | | Paper | | | | Coated paper | Coated paper | Coated paper | Coated paper | Coated paper |
| Blend Ratio | | 10-50 wt % of particles (with respect to resin solid content) | | | | 37% | 37% | 13% | 37% | 17% |

TABLE 2

| | Wax | Particle size | Melting Point | Main frame | NV | Example 6 | Example 7 | Example 8 | Example 9 | Example 10 |
|---|---|---|---|---|---|---|---|---|---|---|
| Primer layer | Wax 1 | 6 | 110 | PE | 100% | | | | 4 | 4 |
| | Wax 2 | 8 | 110 | PE | 100% | | | | 5 | |
| | Wax 3 | 8 | 97 | PE | 100% | 2 | 1 | 0.5 | | 5 |

TABLE 2-continued

| | Wax | Particle size | Melting Point | Main frame | NV | Example 6 | Example 7 | Example 8 | Example 9 | Example 10 |
|---|---|---|---|---|---|---|---|---|---|---|
| | Wax 4 | 0.08 | 130 | PE | 34% | | | | | |
| | Wax 5 | 0.075 | 135 | PE | 32% | | | | | |
| | Wax 6 | 3.5 | 140 | Modified PE | 100% | | | | | |
| | Wax 7 | 5 | 111 | PE carnaba alloy | 100% | | | | | |
| | Wax 8 | 15 | 160 | PP series | 100% | | | | | |
| | Comparative Wax 1 | 18 | 160 | PP series | 100% | | | | | |
| | Comparative Wax 2 | 20 | 75 | Amide | 100% | | | | | |
| | Comparative Wax 3 | 5 | 175 | Modified organic polymer | 100% | | | | | |
| | Aqueous resin | Acid value | Tg | | | | | | | |
| | Resin 1 | 90 | −33 | | 42% | 57.5 | 57.5 | 57.5 | 57.5 | 57.5 |
| | Resin 2 | 65 | −33 | | 47.30% | | | | | |
| | Resin 3 | 130 | 19 | | 39.50% | | | | | |
| | Resin 4 | 87 | −5 | | 35% | | | | | |
| | Resin 5 | 157 | 39 | | 19.50% | | | | | |
| | Resin 6 | 30 | 14 | | 50% | | | | | |
| | Resin 7 | 128 | 25 | | 41.50% | | | | | |
| | Sillica | Particle size | | | | | | | | |
| | Sillica 1 | 4 | | | 100% | | 7 | 7 | 7 | 7 |
| | Sillica 2 | 2 | | | | | | | | |
| | | Solvent Water | | | | 33.5 | 34.5 | 35 | 26.5 | 26.5 |
| | | Total | | | | 100 | 100 | 100 | 100 | 100 |
| Base material | | Paper | | | | Coated paper | Coated paper | Coated paper | Coated paper | Coated paper |
| Blend Ratio | | 10-50 wt % of particles (with respect to resin solid content) | | | | 8% | 4% | 2% | 37% | 37% |

TABLE 3

| | Wax | Particle size | Melting Point | Main frame | NV | Example 11 | Example 12 | Example 13 | Example 14 | Example 15 |
|---|---|---|---|---|---|---|---|---|---|---|
| Primer layer | Wax 1 | 6 | 110 | PE | 100% | 4 | 4 | | | 4 |
| | Wax 2 | 8 | 110 | PE | 100% | | | | | |
| | Wax 3 | 8 | 97 | PE | 100% | | | | | |
| | Wax 4 | 0.08 | 130 | PE | 34% | 5 | | | | 5 |
| | Wax 5 | 0.075 | 135 | PE | 32% | | 5 | 5 | 5 | |
| | Wax 6 | 3.5 | 140 | Modified PE | 100% | | | | | |
| | Wax 7 | 5 | 111 | PE carnaba alloy | 100% | | | 4 | | |
| | Wax 8 | 15 | 160 | PP series | 100% | | | | 4 | |
| | Comparative Wax 1 | 18 | 160 | PP series | 100% | | | | | |
| | Comparative Wax 2 | 20 | 75 | Amide | 100% | | | | | |
| | Comparative Wax 3 | 5 | 175 | Modified organic polymer | 100% | | | | | |
| | Aqueous resin | Acid value | Tg | | | | | | | |
| | Resin 1 | 90 | −33 | | 42% | 57.5 | 57.5 | 57.5 | 57.5 | |
| | Resin 2 | 65 | −33 | | 47.30% | | | | | 57.5 |
| | Resin 3 | 130 | 19 | | 39.50% | | | | | |
| | Resin 4 | 87 | −5 | | 35% | | | | | |
| | Resin 5 | 157 | 39 | | 19.50% | | | | | |
| | Resin 6 | 30 | 14 | | 50% | | | | | |
| | Resin 7 | 128 | 25 | | 41.50% | | | | | |
| | Sillica | Particle size | | | | | | | | |
| | Sillica 1 | 4 | | | 100% | 7 | 7 | 7 | 7 | 7 |
| | Sillica 2 | 2 | | | | | | | | |
| | | Solvent Water | | | | 26.5 | 26.5 | 26.5 | 26.5 | 26.5 |
| | | Total | | | | 100 | 100 | 100 | 100 | 100 |

TABLE 3-continued

|  | Wax | Particle size | Melting Point | Main frame | NV | Example 11 | Example 12 | Example 13 | Example 14 | Example 15 |
|---|---|---|---|---|---|---|---|---|---|---|
| Base material | Paper | | | | | Coated paper | Coated paper | Coated paper | Coated paper | Non-coated paper |
| Blend Ratio | 10-50 wt % of particles (with respect to resin solid content) | | | | | 24% | 23% | 23% | 23% | 21% |

TABLE 4

|  | Wax | Particle size | Melting Point | Main frame | NV | Example 16 | Example 17 | Example 18 | Example 19 | Example 20 |
|---|---|---|---|---|---|---|---|---|---|---|
| Primer layer | Wax 1 | 6 | 110 | PE | 100% | 4 | 4 | 4 | 4 | 4 |
|  | Wax 2 | 8 | 110 | PE | 100% | | | | | |
|  | Wax 3 | 8 | 97 | PE | 100% | | | | | |
|  | Wax 4 | 0.08 | 130 | PE | 34% | 5 | 5 | 5 | 5 | 5 |
|  | Wax 5 | 0.075 | 135 | PE | 32% | | | | | |
|  | Wax 6 | 3.5 | 140 | Modified PE | 100% | | | | | |
|  | Wax 7 | 5 | 111 | PE carnaba alloy | 100% | | | | | |
|  | Wax 8 | 15 | 160 | PP series | 100% | | | | | |
|  | Comparative Wax 1 | 18 | 160 | PP series | 100% | | | | | |
|  | Comparative Wax 2 | 20 | 75 | Amide | 100% | | | | | |
|  | Comparative Wax 3 | 5 | 175 | Modified organic polymer | 100% | | | | | |
|  | Aqueous resin | Acid value | Tg | | | | | | | |
|  | Resin 1 | 90 | −33 | | 42% | | | | | |
|  | Resin 2 | 65 | −33 | | 47.30% | | | | | |
|  | Resin 3 | 130 | 19 | | 39.50% | 57.5 | | | | |
|  | Resin 4 | 87 | −5 | | 35% | | 57.5 | | | |
|  | Resin 5 | 157 | 39 | | 19.50% | | | 57.5 | | |
|  | Resin 6 | 30 | 14 | | 50% | | | | 57.5 | |
|  | Resin 7 | 128 | 25 | | 41.50% | | | | | 57.5 |
|  | Sillica | Particle size | | | | | | | | |
|  | Sillica 1 | 4 | | | 100% | 7 | 7 | 7 | 7 | 7 |
|  | Sillica 2 | 2 | | | | | | | | |
|  | Solvent | Water | | | | 26.5 | 26.5 | 26.5 | 26.5 | 26.5 |
|  | Total | | | | | 100 | 100 | 100 | 100 | 100 |
| Base material | Paper | | | | | Non-coated paper | Non-coated paper | Non-coated paper | Non-coated paper | Non-coated paper |
| Blend Ratio | 10-50 wt % of particles (with respect to resin solid content) | | | | | 25% | 28% | 51% | 20% | 24% |

TABLE 5

|  | Wax | Particle size | Melting Point | Main frame | NV | Example 21 | Example 22 | Example 23 | Example 24 | Example 25 |
|---|---|---|---|---|---|---|---|---|---|---|
| Primer layer | Wax 1 | 6 | 110 | PE | 100% | 4 | 4 | 4 | 2 | |
|  | Wax 2 | 8 | 110 | PE | 100% | | | | | |
|  | Wax 3 | 8 | 97 | PE | 100% | 5 | 5 | 5 | 10 | 5 |
|  | Wax 4 | 0.08 | 130 | PE | 34% | | | | | |
|  | Wax 5 | 0.075 | 135 | PE | 32% | | | | | |
|  | Wax 6 | 3.5 | 140 | Modified PE | 100% | | | | | |
|  | Wax 7 | 5 | 111 | PE carnaba alloy | 100% | | | | | |
|  | Wax 8 | 15 | 160 | PP series | 100% | | | | | |
|  | Comparative Wax 1 | 18 | 160 | PP series | 100% | | | | | |
|  | Comparative Wax 2 | 20 | 75 | Amide | 100% | | | | | |

TABLE 5-continued

|  | Wax | Particle size | Melting Point | Main frame | NV | Example 21 | Example 22 | Example 23 | Example 24 | Example 25 |
|---|---|---|---|---|---|---|---|---|---|---|
|  | Comparative Wax 3 | 5 | 175 | Modified organic polymer | 100% |  |  |  |  |  |
|  | Aqueous resin | Acid value | Tg |  |  |  |  |  |  |  |
|  | Resin 1 | 90 | −33 |  | 42% | 57.5 | 57.5 | 52.5 |  | 33 |
|  | Resin 2 | 65 | −33 |  | 47.30% |  |  |  | 31 |  |
|  | Resin 3 | 130 | 19 |  | 39.50% |  |  | 5 |  |  |
|  | Resin 4 | 87 | −5 |  | 35% |  |  |  | 31 | 33 |
|  | Resin 5 | 157 | 39 |  | 19.50% |  |  |  |  |  |
|  | Resin 6 | 30 | 14 |  | 50% |  |  |  |  |  |
|  | Resin 7 | 128 | 25 |  | 41.50% |  |  |  |  |  |
|  | Sillica | Particle size |  |  |  |  |  |  |  |  |
|  | Sillica 1 | 4 |  |  | 100% |  |  | 7 | 6 | 8 |
|  | Sillica 2 | 2 |  |  |  | 7 |  |  |  |  |
|  |  | Solvent Water |  |  |  | 26.5 | 33.5 | 26.5 | 20 | 21 |
|  |  | Total |  |  |  | 100 | 100 | 100 | 100 | 100 |
| Base material |  | Paper |  |  |  | Coated paper | Coated paper | Coated paper | Coated paper | Coated paper |
| Blend Ratio |  | 10-50 wt % of particles (with respect to resin solid content) |  |  |  | 24% | 24% | 24% | 21% | 7% |

TABLE 6

|  | Wax | Particle size | Melting Point | Main frame | NV | Example 26 | Example 27 | Example 28 | Example 29 | Comparative Example 1 |
|---|---|---|---|---|---|---|---|---|---|---|
| Primer layer | Wax 1 | 6 | 110 | PE | 100% | 10 | 2 | 4 |  |  |
|  | Wax 2 | 8 | 110 | PE | 100% |  |  |  |  |  |
|  | Wax 3 | 8 | 97 | PE | 100% |  |  |  |  |  |
|  | Wax 4 | 0.08 | 130 | PE | 34% | 10 | 5 | 5 | 3.5 |  |
|  | Wax 5 | 0.075 | 135 | PE | 32% |  |  |  |  |  |
|  | Wax 6 | 3.5 | 140 | Modified PE | 100% |  |  |  |  |  |
|  | Wax 7 | 5 | 111 | PE carnaba alloy | 100% |  |  |  | 1.5 |  |
|  | Wax 8 | 15 | 160 | PP series | 100% | 40 |  |  |  |  |
|  | Comparative Wax 1 | 18 | 160 | PP series | 100% |  |  |  |  | 9 |
|  | Comparative Wax 2 | 20 | 75 | Amide | 100% |  |  |  |  |  |
|  | Comparative Wax 3 | 5 | 175 | Modified organic polymer | 100% | 45 |  |  |  |  |
|  | Aqueous resin | Acid value | Tg |  |  |  |  |  |  |  |
|  | Resin 1 | 90 | −33 |  | 42% | 30 |  |  |  | 57.5 |
|  | Resin 2 | 65 | −33 |  | 47.30% | 50 | 33 | 33 | 22 |  |
|  | Resin 3 | 130 | 19 |  | 39.50% |  |  |  | 5 |  |
|  | Resin 4 | 87 | −5 |  | 35% | 30 | 33 | 33 |  |  |
|  | Resin 5 | 157 | 39 |  | 19.50% |  |  |  | 48 |  |
|  | Resin 6 | 30 | 14 |  | 50% |  |  |  |  |  |
|  | Resin 7 | 128 | 25 |  | 41.50% | 55 |  |  |  |  |
|  | Sillica | Particle size |  |  |  |  |  |  |  |  |
|  | Sillica 1 | 4 |  |  | 100% | 8 | 6 | 4 | 1.5 | 7 |
|  | Sillica 2 | 2 |  |  |  |  |  |  |  |  |
|  |  | Solvent Water |  |  |  | 12 | 21 | 21 | 18.5 | 26.5 |
|  |  |  |  |  |  | 60 |  |  |  |  |
|  |  | Total |  |  |  | 100 | 100 | 100 | 100 | 100 |
| Base material |  | Paper |  |  |  | Coated paper | Coated paper | Coated paper | Coated paper | Coated paper |
| Blend Ratio |  | 10-50 wt % of particles (with respect to resin solid content) |  |  |  | 58% 65 | 14% | 21% | 12% | 37% |

TABLE 7

| | Wax | Particle size | Melting Point | Main frame | NV | Comparative Example 2 | Comparative Example 3 | Comparative Example 4 | Comparative Example 5 | Comparative Example 6 |
|---|---|---|---|---|---|---|---|---|---|---|
| Primer layer | Wax 1 | 6 | 110 | PE | 100% | | | | | |
| | Wax 2 | 8 | 110 | PE | 100% | | | | | |
| | Wax 3 | 8 | 97 | PE | 100% | | | | | |
| | Wax 4 | 0.08 | 130 | PE | 34% | | | | | |
| | Wax 5 | 0.075 | 135 | PE | 32% | | | | | |
| | Wax 6 | 3.5 | 140 | Modified PE | 100% | | | | | |
| | Wax 7 | 5 | 111 | PE carnaba alloy | 100% | | | | | |
| | Wax 8 | 15 | 160 | PP series | 100% | | | | | |
| | Comparative Wax 1 | 18 | 160 | PP series | 100% | | | | 9 | |
| | Comparative Wax 2 | 20 | 75 | Amide | 100% | 9 | | | 9 | |
| | Comparative Wax 3 | 5 | 175 | Modified organic polymer | 100% | | 9 | | | 9 |
| | Aqueous resin | Acid value | Tg | | | | | | | |
| | Resin 1 | 90 | −33 | | 42% | 57.5 | 57.5 | | | |
| | Resin 2 | 65 | −33 | | 47.30% | | | 33 | 33 | 33 |
| | Resin 3 | 130 | 19 | | 39.50% | | | | | |
| | Resin 4 | 87 | −5 | | 35% | | | 33 | 33 | 33 |
| | Resin 5 | 157 | 39 | | 19.50% | | | | | |
| | Resin 6 | 30 | 14 | | 50% | | | | | |
| | Resin 7 | 128 | 25 | | 41.50% | | | | | |
| | Sillica | Particle size | | | | | | | | |
| | Sillica 1 | 4 | | | 100% | 7 | 7 | 6 | 6 | 6 |
| | Sillica 2 | 2 | | | | | | | | |
| | Solvent | | | Water | | 26.5 | 26.5 | 19 | 19 | 19 |
| Base material | Total | | | Paper | | 100 Coated paper | 100 Coated paper | 100 Coated paper | 100 Coated paper | 100 Coated paper |
| Blend Ratio | 10-50 wt % of particles (with respect to resin solid content) | | | | | 37% | 37% | 33% | 33% | 33% |

TABLE 8

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Evaluation Result | Abrasion resistance | ○ | ○ | ◉ | ○ | ◉ | ◉ | ○ | ○ | ○ | ○ |
| | Adhesiveness | ○ | ○ | ○ | ○ | ○ | ○ | ○ | ○ | ○ | ○ |
| | Image formation | ○ | ○ | ○ | ○ | ○ | ○ | ○ | ○ | ○ | ○ |
| | Washability | ◉ | ◉ | ◉ | ◉ | ◉ | ◉ | ◉ | ◉ | ◉ | ◉ |
| | Stableness | ○ | ○ | ○ | ○ | ○ | ○ | ○ | ○ | ○ | ○ |

TABLE 9

| | | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Evaluation Result | Abrasion resistance | ○ | ◉ | ○ | ○ | ○ | ○ | ○ | ○ | ○ | ○ |
| | Adhesiveness | ○ | ○ | ○ | ○ | ◉ | ◉ | ○ | ◉ | ○ | ○ |
| | Image formation | ○ | ○ | ○ | ○ | ◉ | ○ | ◉ | ◉ | ○ | ◉ |
| | Washability | ◉ | ◉ | ◉ | ◉ | ○ | ◉ | ○ | ◉ | ○ | ◉ |
| | Stableness | ○ | ○ | ○ | ○ | ○ | ○ | ○ | ○ | ○ | ○ |

TABLE 10

| | | Example 21 | Example 22 | Example 23 | Example 24 | Example 25 | Example 26 | Example 27 | Example 28 | Example 29 |
|---|---|---|---|---|---|---|---|---|---|---|
| Evaluaton Result | Abrasion resistance | ○ | ○ | ○ | ◎ | ○ | ◎ | ○ | ○ | ○ |
| | Adhesiveness | ○ | ○ | ○ | ○ | ○ | ○ | ◎ | ◎ | ◎ |
| | Image formation | ◎ | ○ | ◎ | ◎ | ◎ | ◎ | ○ | ○ | ○ |
| | Washability | ◎ | ◎ | ◎ | ○ | ◎ | ◎ | ○ | ○ | ○ |
| | Stableness | ○ | ○ | ○ | ○ | ○ | ○ | ○ | ○ | ○ |

TABLE 11

| | | Comparative Example 1 | Comparative Example 2 | Comparative Example 3 | Comparative Example 4 | Comparative Example 5 | Comparative Example 6 |
|---|---|---|---|---|---|---|---|
| Evaluation Result | Abrasion resistance | Δ | X | Δ | Δ | X | Δ |
| | Adhesiveness | ○ | ○ | ○ | ◎ | ◎ | ◎ |
| | Image formation | ○ | Δ | ○ | ○ | Δ | ○ |
| | Washability | ◎ | ○ | ○ | ○ | ○ | ○ |
| | Stableness | X | X | Δ | X | X | Δ |

INDUSTRIAL APPLICABILITY

The primer and printed material formed after primer application of the present invention is excellent in abrasion resistance, adhesiveness, image formation, washability, and stability. Thus, the primer and printed material of the present invention are favorably used to improve inkjet ink printing.

The invention claimed is:

1. A primer for inkjet printing comprising an aqueous resin and hydrophobic particles, wherein the hydrophobic particles have a particle size of 0.05 µm to 15 µm, and wherein the hydrophobic particles have a melting point of 80° C. to 160° C., and wherein the primer improves abrasive-resistance of an inkjet ink printed on a printed material, wherein the one aqueous resin is an anionic acrylic emulsion
   wherein the aqueous resin has an acid value of 90 to 160 mgKOH/g,
   wherein a colorant is not included in the primer, and
   wherein the hydrophobic particles are in an amount of 0.5 wt % to 9 wt %.

2. The primer according to claim 1, wherein the hydrophobic particles comprise polyethylene, a modified polyethylene, polypropylene, or a combination thereof.

3. The primer for inkjet according to claim 1, wherein the hydrophobic particles are in a blend ratio of 2 wt % to 60 wt % with respect to resin solid content.

4. The primer according to claim 1, wherein the aqueous resin has a glass transition temperature of −70° C. to 40° C.

5. The primer for inkjet according to claim 1, further comprising filler particles, wherein the filler particles are selected from silica, titanium oxide, aluminum oxide, calcium carbonate, or combinations thereof.

6. The primer according to claim 1, wherein the hydrophobic particles have a particle size of 0.075 µm to 8 µm.

7. The primer according to claim 3, wherein the hydrophobic particles are in a blend ratio of 8 wt % to 50 wt % with respect to resin solid content.

8. The primer according to claim 3, wherein the hydrophobic particles are in a blend ratio of 10 wt % to 37 wt % with respect to resin solid content.

9. A primer for inkjet printing comprising at least one aqueous resin and hydrophobic particles, wherein the hydrophobic particles have a particle size of 0.05 µm to 15 µm, and wherein the hydrophobic particles have a melting point of 80° C. to 160° C., and wherein the primer improves abrasive-resistance of an inkjet ink printed on a printed material,
   wherein the hydrophobic particles comprise a mixture of at least one small particle wax and at least one large particle wax, and wherein the at least one small particle wax is in a particle size range of 0.05 µm to 0.08 µm and the at least one large particle wax is in a particle size range of 6 µm to 15 µm, wherein the at least one aqueous resin is an anionic acrylic emulsion
   wherein the at least one aqueous resin has an acid value of 90 to 160 mgKOH/g, and
   wherein the hydrophobic particles are in an amount of 0.5 wt % to 9 wt %.

10. The primer according to claim 1, wherein the aqueous resin has an acid value of 90 to 130 mgKOH/g.

11. The primer according to claim 4, wherein the aqueous resin has a glass transition temperature of −33° C. to 10° C.

12. A printed material comprising the primer of claim 1 coated onto a base material, wherein the printed material has a slip angle of 10° to 20°.

13. The printed material according to claim 12, wherein the primer directly or indirectly contacts an image forming layer, and wherein the image forming layer is printed by an inkjet ink.

14. The printed material according to claim 13, wherein the inkjet ink is a UV curable inkjet ink.

15. The printed material according to claim 12, wherein the primer has a wet coating weight of 2 to 50 g/cm$^2$.

16. The printed material according to claim 12, wherein the UV curable inkjet ink has a coating weight of 0 to 25 g/m$^2$.

17. The printed material according to claim 12, wherein the base material is a plastic cardboard or a paper cardboard, wherein the paper cardboard comprises a flute and a liner, and wherein the flute is situated in the interior of a cardboard base and the liner is situated at the surface of the cardboard base.

18. The printed material according to claim 17, wherein the liner is a coated paper.

19. The printed material according to claim 17, wherein the liner is a non-coated paper.

20. The primer according to claim 1, wherein the aqueous resin is an anionic resin or a cationic resin.

\* \* \* \* \*

UNITED STATES PATENT AND TRADEMARK OFFICE
CERTIFICATE OF CORRECTION

PATENT NO. : 11,179,957 B2
APPLICATION NO. : 16/516919
DATED : November 23, 2021
INVENTOR(S) : S. Washio et al.

It is certified that error appears in the above-identified patent and that said Letters Patent is hereby corrected as shown below:

On the Title Page

Item (57)/Abstract, Line 3, please change "100" to -- 160 --

Signed and Sealed this
Twenty-fifth Day of April, 2023

Katherine Kelly Vidal
*Director of the United States Patent and Trademark Office*